US012030263B2

(12) United States Patent
Holmes, IV

(10) Patent No.: US 12,030,263 B2
(45) Date of Patent: Jul. 9, 2024

(54) COMPOSITE MATERIALS AND RELATED METHODS FOR MANUFACTURING COMPOSITE MATERIALS

(71) Applicant: James C. Holmes, IV, Charleston, SC (US)

(72) Inventor: James C. Holmes, IV, Charleston, SC (US)

(73) Assignee: Greentex Solutions, LLC, Charleston, SC (US)

( * ) Notice: Subject to any disclaimer, the term of this patent is extended or adjusted under 35 U.S.C. 154(b) by 605 days.

(21) Appl. No.: 17/104,065

(22) Filed: Nov. 25, 2020

(65) Prior Publication Data

US 2021/0078264 A1 Mar. 18, 2021

Related U.S. Application Data

(63) Continuation of application No. 15/350,976, filed on Nov. 14, 2016, now abandoned.
(Continued)

(51) Int. Cl.
| | | |
|---|---|---|
| *B29C 70/34* | (2006.01) | |
| *B29C 70/12* | (2006.01) | |
| *D04H 1/4242* | (2012.01) | |
| *D04H 1/58* | (2012.01) | |
| *B29K 105/08* | (2006.01) | |

(Continued)

(52) U.S. Cl.
CPC ............ *B29C 70/345* (2013.01); *B29C 70/12* (2013.01); *D04H 1/4242* (2013.01); *D04H 1/58* (2013.01); *B29K 2105/0854* (2013.01); *B29K 2105/12* (2013.01); *B29K 2279/00* (2013.01); *B29K 2309/00* (2013.01); *B29K 2313/00* (2013.01)

(58) Field of Classification Search
CPC .. B32B 5/02; B32B 9/00; B32B 27/04; B32B 37/12; B32B 37/02
See application file for complete search history.

(56) References Cited

U.S. PATENT DOCUMENTS

| 5,215,695 A | 6/1993 | Bortoluzzi et al. |
| 5,288,760 A | 2/1994 | Morgan |
| (Continued) | | |

FOREIGN PATENT DOCUMENTS

| WO | 2013076601 | 5/2013 |
| WO | 2020028914 | 2/2020 |
| WO | 2020222221 | 11/2020 |

OTHER PUBLICATIONS

Pimenta, Soraia; Recycling carbon fibre reinforced polymers for structural applications: technology review and market outlook; Waste Management vol. 31, pp. 378-392, ISSN: 0956-053X; 2011.

*Primary Examiner* — Alison L Hindenlang
*Assistant Examiner* — Shibin Liang
(74) *Attorney, Agent, or Firm* — Womble Bond Dickinson (US) LLP

(57) ABSTRACT

The present disclosure relates to composites. One composite may include a resin and oxidized polyacrylonitrile fibers. The oxidized polyacrylonitrile fibers may be provided as a nonwoven fabric. An additional composite may include a resin and material scraps respectively including carbon fibers. The material scraps may be positioned to at least partially overlap one another and define a substantially continuous layer. The material scraps may be provided as a fabric and/or a plurality of loose fibers.

17 Claims, 17 Drawing Sheets

Related U.S. Application Data

(60) Provisional application No. 62/255,029, filed on Nov. 13, 2015.

(51) Int. Cl.
  *B29K 105/12* (2006.01)
  *B29K 279/00* (2006.01)
  *B29K 309/00* (2006.01)

(56) References Cited

U.S. PATENT DOCUMENTS

| | | | |
|---|---|---|---|
| 5,569,424 A | 10/1996 | Amour | |
| 5,589,260 A | 12/1996 | Zvi et al. | |
| 5,665,295 A | 9/1997 | Takamoto et al. | |
| 5,728,847 A * | 3/1998 | Ohara | C08J 11/16 549/274 |
| 5,879,601 A | 3/1999 | Baker | |
| 5,958,164 A | 9/1999 | Ishiwatari et al. | |
| 6,153,291 A | 11/2000 | Strasser | |
| 6,361,722 B1 | 3/2002 | Theys et al. | |
| 6,986,854 B2 | 1/2006 | Sumi et al. | |
| 7,147,734 B2 | 12/2006 | Ogle et al. | |
| 7,459,493 B2 | 12/2008 | Singer | |
| 7,527,865 B2 | 5/2009 | Kessing | |
| 7,811,489 B2 | 10/2010 | Pervan et al. | |
| 8,431,054 B2 | 4/2013 | Pervan et al. | |
| 8,474,736 B2 | 7/2013 | Lehtinen et al. | |
| 8,518,312 B2 | 8/2013 | Katz | |
| 9,028,731 B2 | 5/2015 | Weyant et al. | |
| 9,427,897 B2 | 8/2016 | Versolato et al. | |
| 9,856,358 B2 | 1/2018 | Witte | |
| 10,513,094 B2 | 12/2019 | Persson et al. | |
| 10,603,821 B2 | 3/2020 | Fisher, Jr. et al. | |
| 10,661,482 B2 | 5/2020 | Desbois et al. | |
| 10,913,176 B2 | 2/2021 | Lindgren et al. | |
| 2004/0173239 A1 | 9/2004 | Grove-Nielsen | |
| 2008/0169380 A1 | 7/2008 | Jackson et al. | |
| 2008/0241296 A1* | 10/2008 | Wang | B29C 33/38 264/258 |
| 2012/0077402 A1* | 3/2012 | Grasser | B29B 15/10 442/179 |
| 2013/0192434 A1* | 8/2013 | Hashimoto | B29C 70/48 83/13 |
| 2014/0212624 A1* | 7/2014 | Ayuzawa | B29C 43/36 156/196 |
| 2014/0262088 A1* | 9/2014 | Deka | B29C 70/502 162/146 |
| 2020/0094443 A1 | 3/2020 | Schafter et al. | |

* cited by examiner

306B

306A

COMPOSITE MATERIALS AND RELATED METHODS FOR MANUFACTURING COMPOSITE MATERIALS

CROSS-REFERENCE TO RELATED APPLICATIONS

This application is a continuation of U.S. patent application Ser. No. 15/350,976, filed Nov. 14, 2016, which claims the benefit of U.S. Provisional Patent Application Ser. No. 62/255,029, filed Nov. 13, 2015. The entire contents of each of the above applications are hereby incorporated by reference.

FIELD OF THE DISCLOSURE

The present disclosure relates to composite materials, and more particularly to composites comprising recycled carbon fiber materials and to composites comprising oxidized polyacrylonitrile fibers.

BACKGROUND

The production of carbon fiber materials results in a large quantity of material waste. Accordingly, it may be desirable to provide methods and materials that employ recycled carbon fiber therein. Further, it may be desirable to form composites comprising polyacrylonitrile.

BRIEF SUMMARY OF THE DISCLOSURE

The present disclosure relates to composites comprising recycled carbon fiber materials and composites comprising polyacrylonitrile, which may be recycled. These and other features, aspects, and advantages of the disclosure will be apparent from a reading of the following detailed description together with the accompanying drawings, which are briefly described below.

In one aspect a composite is provided. The composite may include a resin. Further, the composite may include a plurality of oxidized polyacrylonitrile fibers. The oxidized polyacrylonitrile fibers may be provided as a nonwoven fabric.

In some embodiments the oxidized polyacrylonitrile fibers may be provided as a wet-lay nonwoven fabric. The plurality of oxidized polyacrylonitrile fibers may define an outer layer.

In an additional aspect, a method for forming a composite is provided. The method may include forming a plurality of oxidized polyacrylonitrile fibers into a nonwoven fabric. Further, the method may include positioning the nonwoven fabric and a resin in a mold. The method may additionally include curing the resin in the mold.

In some embodiments forming the oxidized polyacrylonitrile fibers into the nonwoven fabric may include forming the oxidized polyacrylonitrile fibers into a wet-lay nonwoven fabric. Further, positioning the nonwoven fabric and the resin in the mold may include positioning the wet-lay nonwoven fabric and the resin in the mold. Positioning the nonwoven fabric in the mold may include forming an outer layer with the nonwoven fabric.

In an additional aspect, a composite is provided. The composite may include a resin. The composite may further include a plurality of material scraps respectively comprising a plurality of carbon fibers. The material scraps may be positioned to at least partially overlap one another and define a substantially continuous layer. The material scraps respectively include the carbon fibers may be provided as a fabric and/or a plurality of loose fibers.

In some embodiments the composite may further include a plurality of pre-impregnated carbon fiber chips defining a second substantially continuous layer. The second substantially continuous layer may be an outer layer. The composite may define a shipping container panel, a countertop, or a storm barrier panel. The composite may further include at least one of an aramid layer and a fiberglass layer. Each of the carbon fibers may define a length greater than about one inch. The material scraps respectively including the carbon fibers may be provided as the fabric and as the loose fibers.

In an additional aspect, a method for forming a composite is provided. The method may include providing a resin. Further, the method may include providing a plurality of material scraps respectively including a plurality of carbon fibers. The material scraps may be provided as a fabric and/or a plurality of loose fibers. The method may further include positioning the material scraps in a mold such that the material scraps at least partially overlap one another and define a substantially continuous layer. Additionally, the method may include adding the resin to the material scraps. Further, the method may include hardening the resin in the mold.

In some embodiments the method may further include providing a plurality of pre-impregnated carbon fiber chips, positioning the pre-impregnated carbon fiber chips in the mold such that the pre-impregnated carbon fiber chips at least partially overlap one another and define a second substantially continuous layer, and adding the resin to the pre-impregnated carbon fiber chips. Positioning the pre-impregnated carbon fiber chips in the mold may include positioning the pre-impregnated carbon fiber chips such that the second substantially continuous layer is an outer layer. The method may further include positioning at least one of an aramid material and a fiberglass material in the mold to define a strengthening layer and adding the resin to the strengthening layer.

In some embodiments providing the material scraps may include retaining the material scraps in an initial size and shape associated with formation of the material scraps. Hardening the resin in the mold may include forming a shipping container panel, a countertop, or a storm barrier panel. Providing the material scraps may include providing the fabric and the loose fibers.

BRIEF DESCRIPTION OF THE FIGURES

Figure 1:
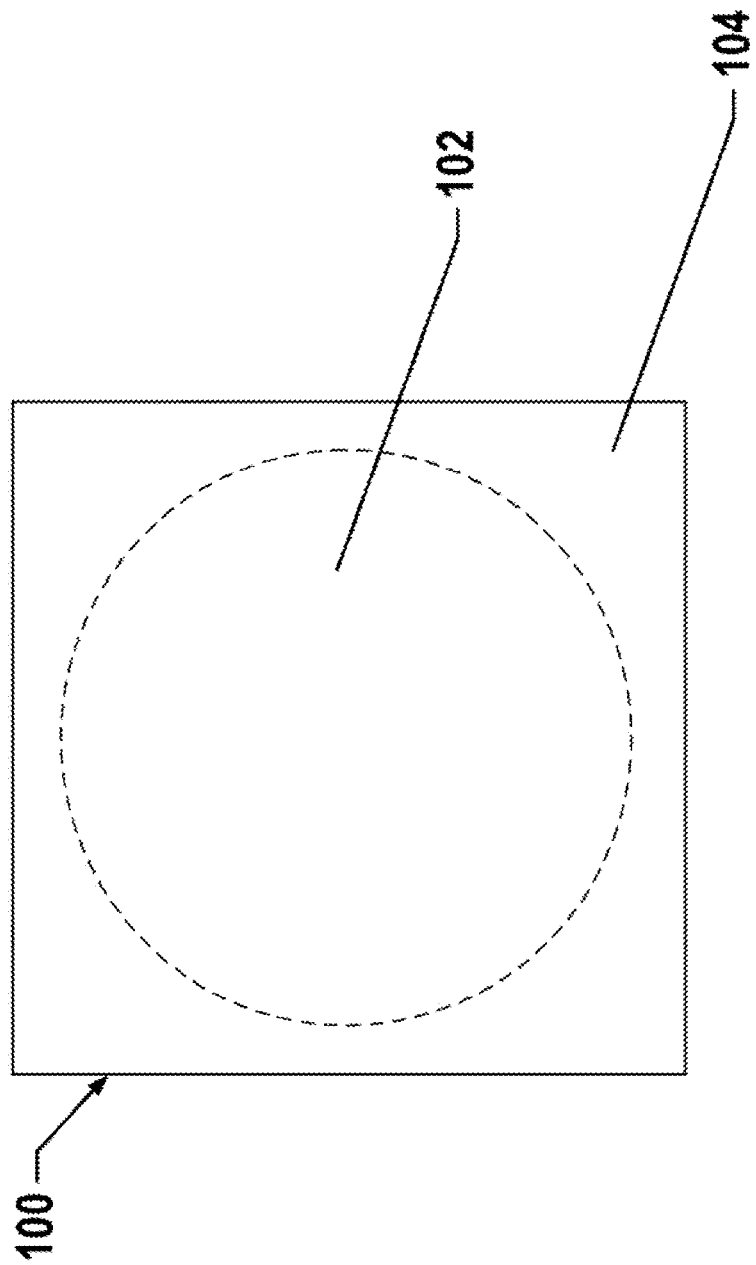
Figure 2:
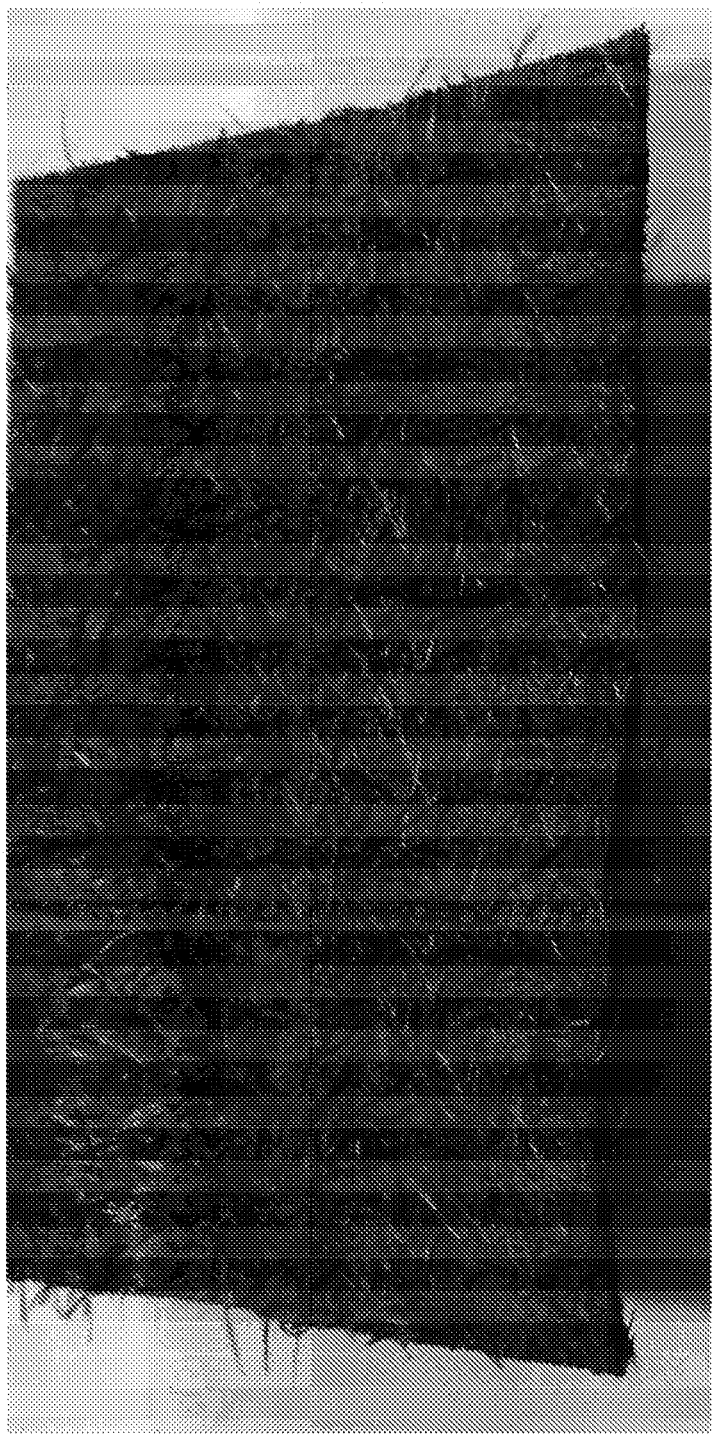
Figure 3:
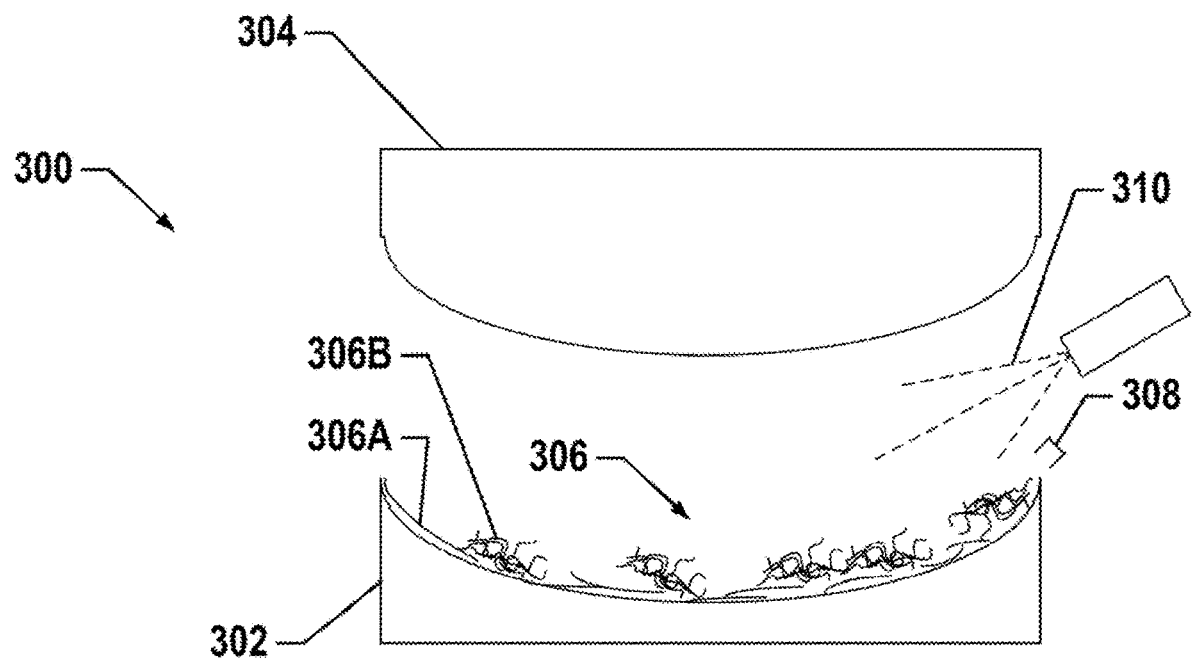
Figure 4:
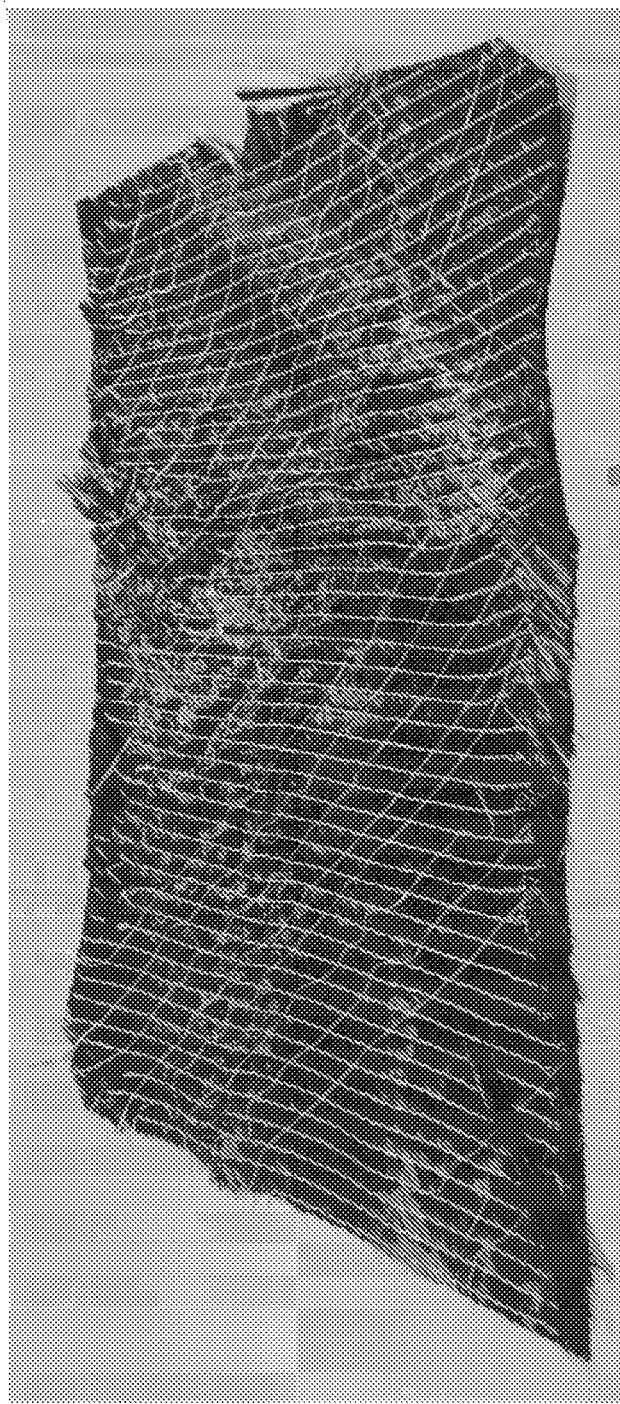
Figure 5:
Figure 6:
Figure 7:
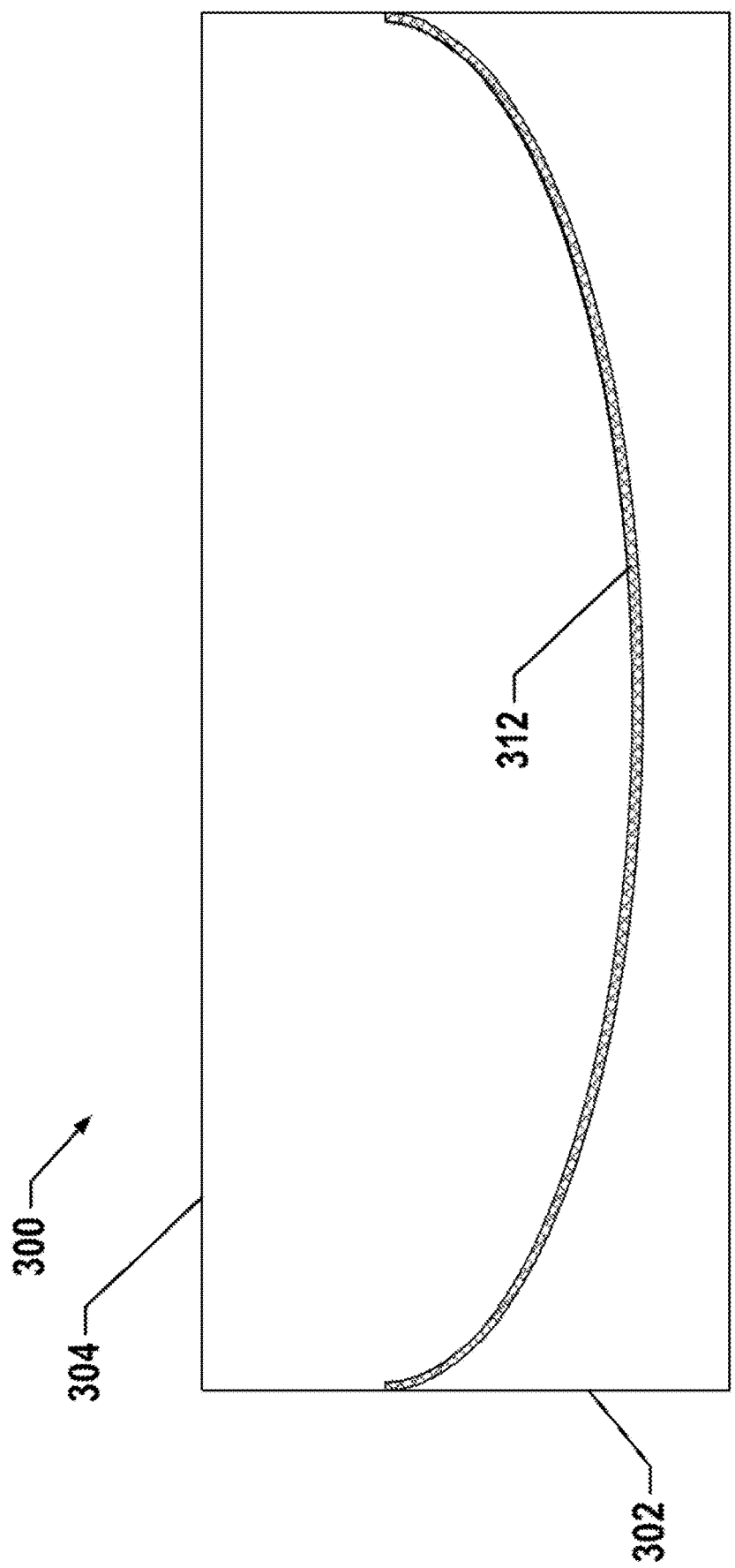
Figure 8:
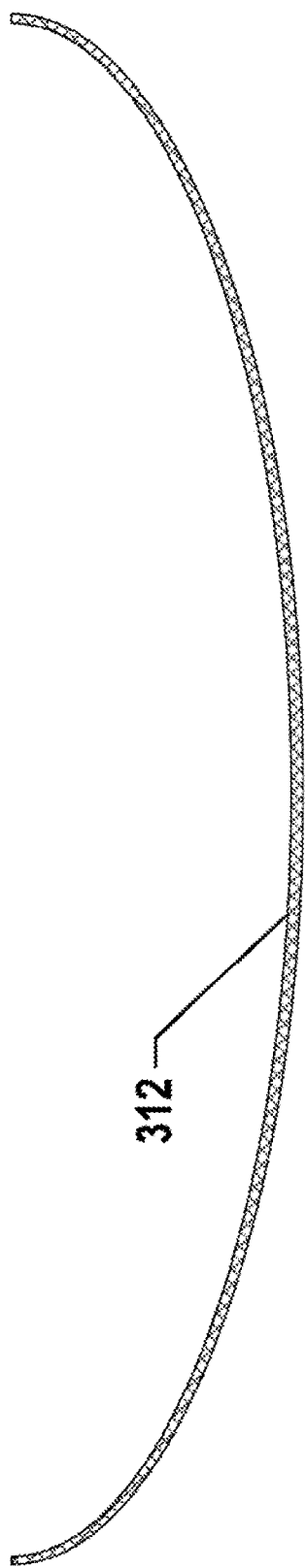
Figure 9:
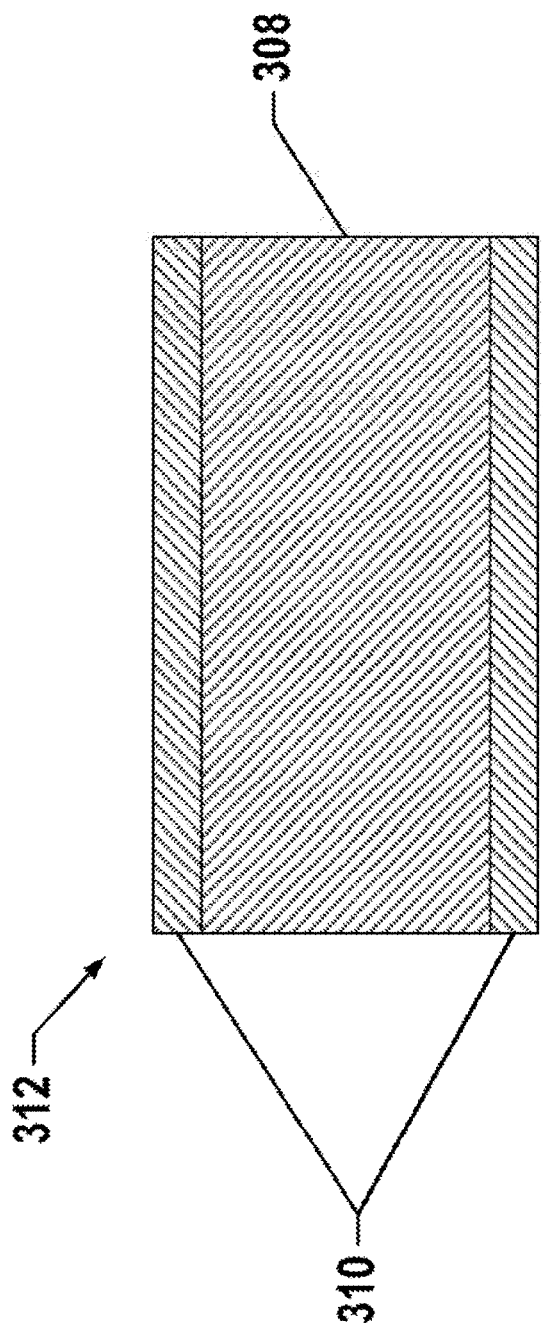
Figure 10:
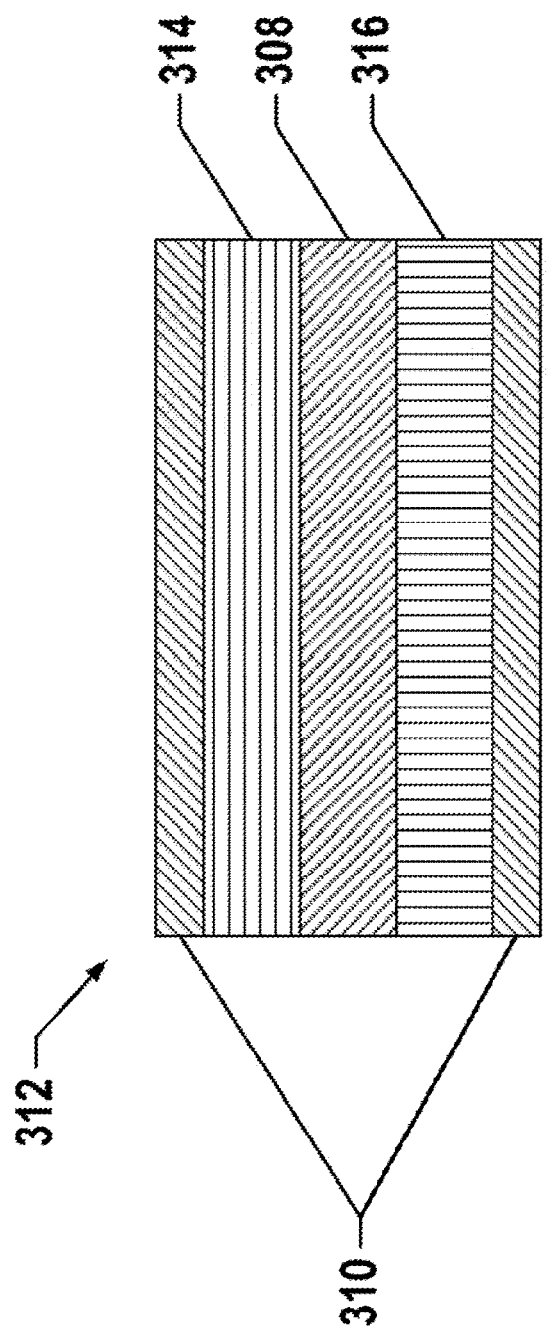
Figure 11:
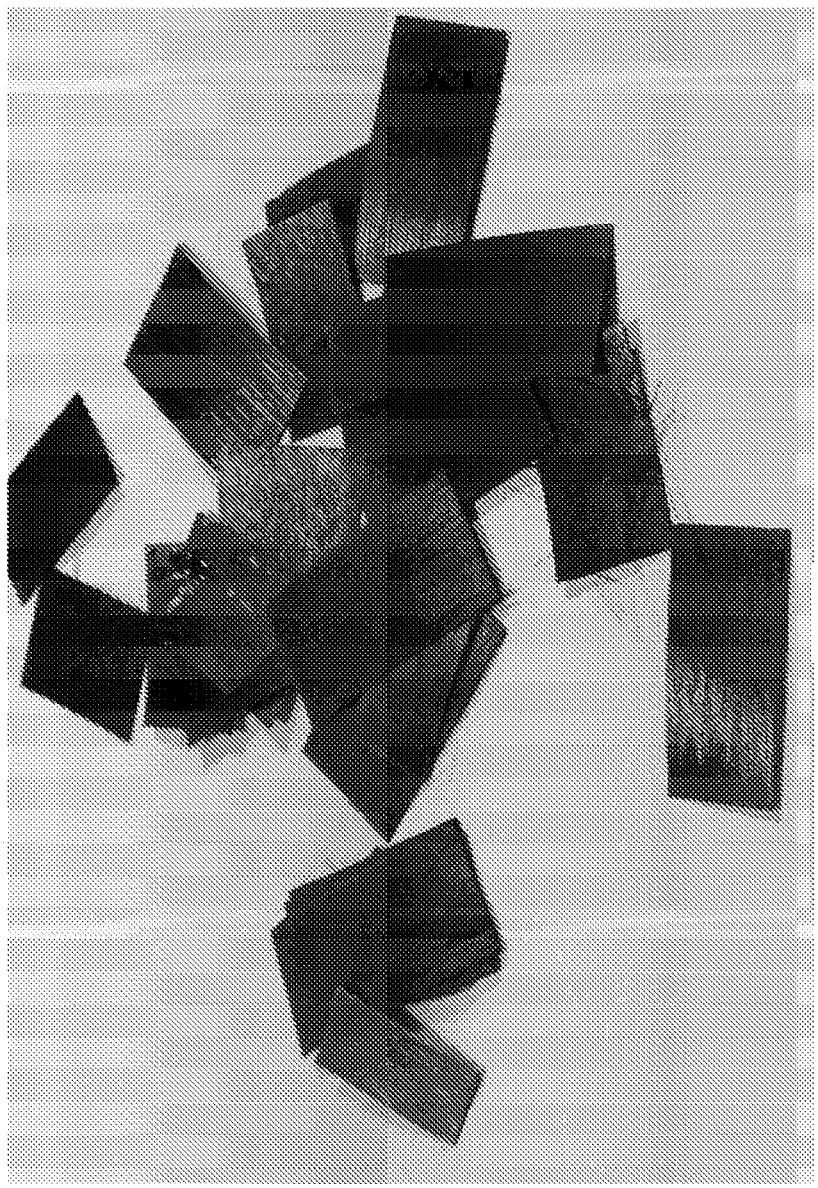
Figure 12:
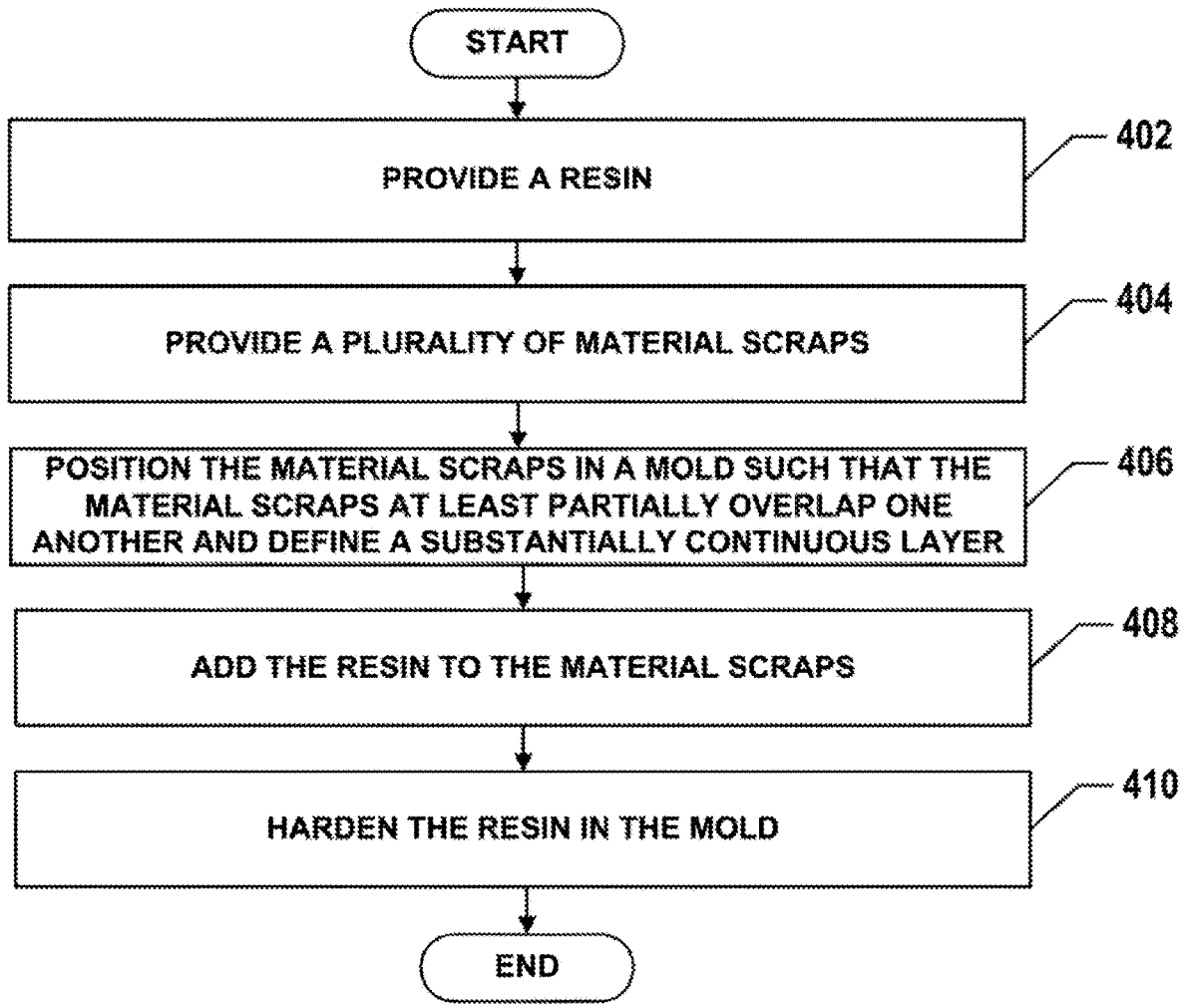
Figure 13:
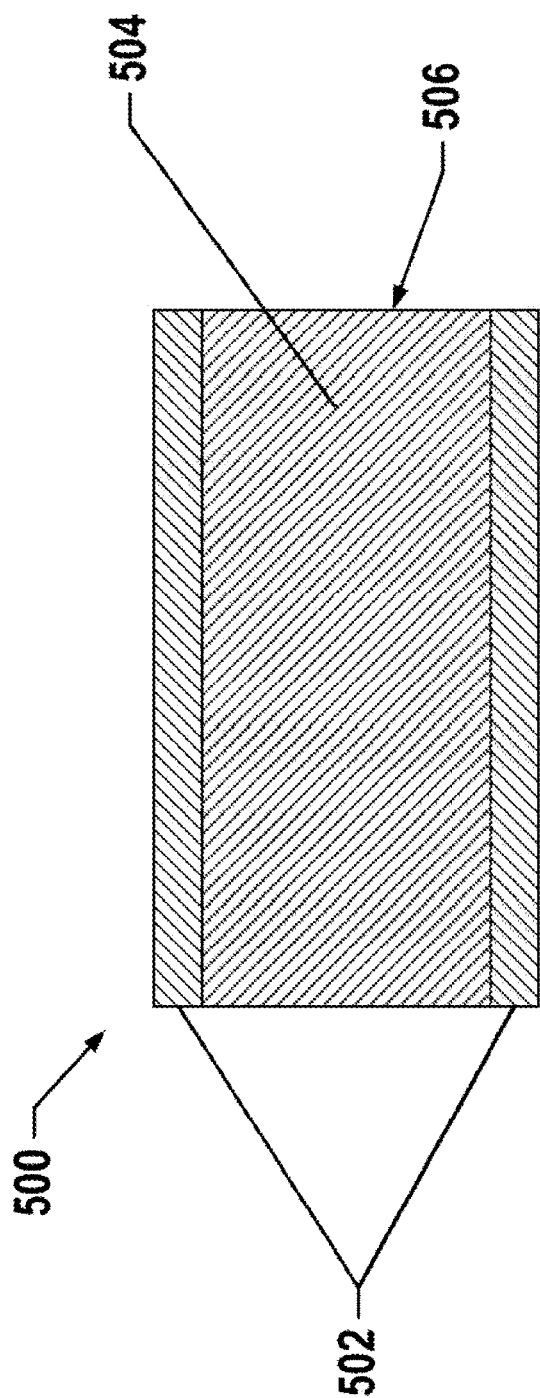
Figure 14:
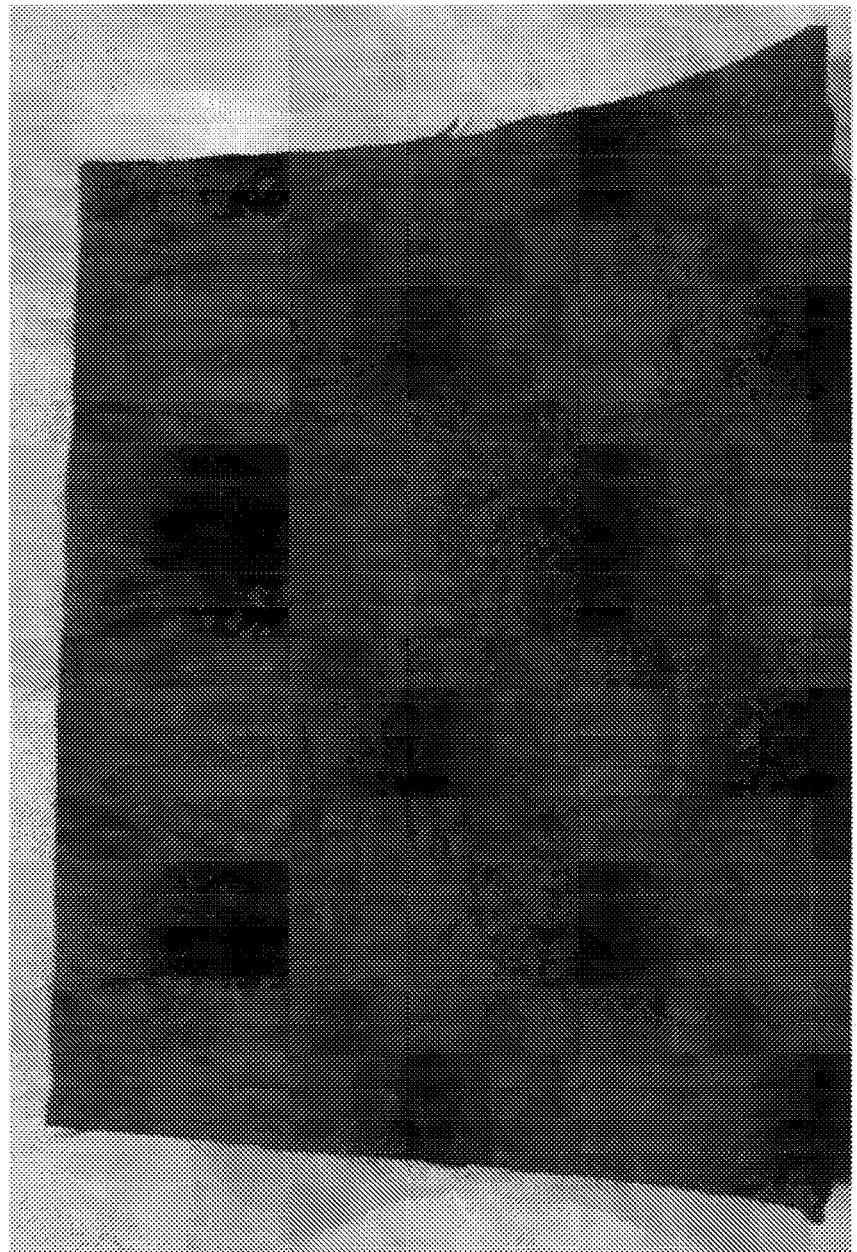
Figure 15:
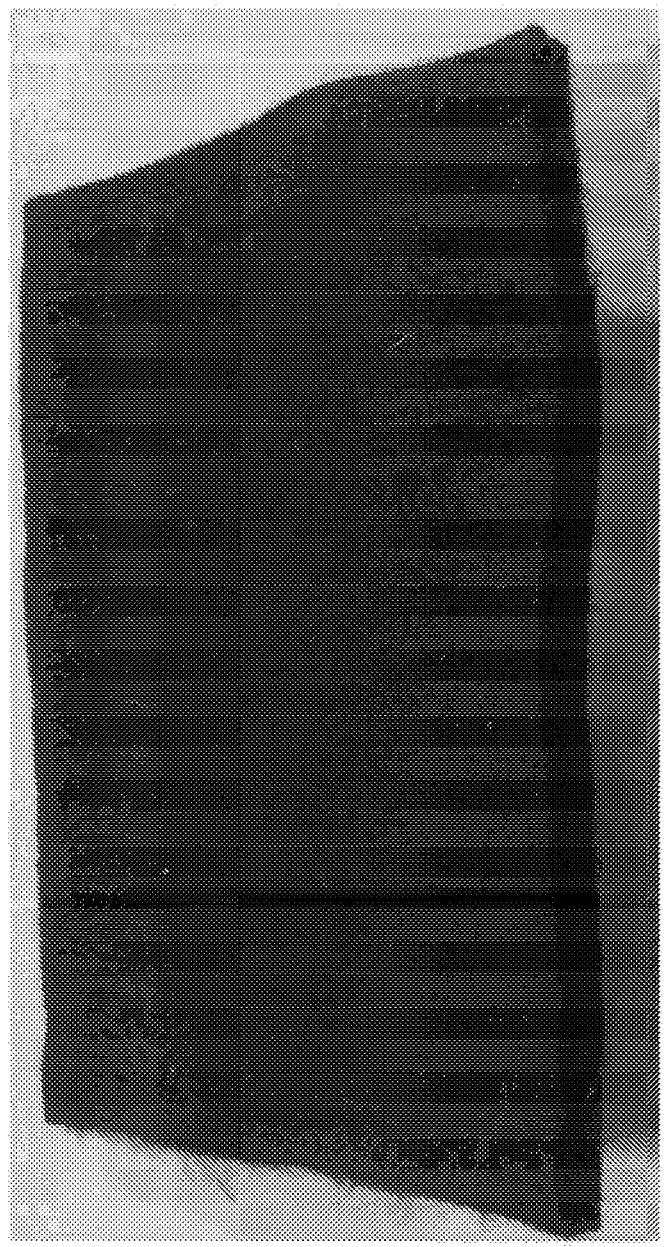
Figure 16:
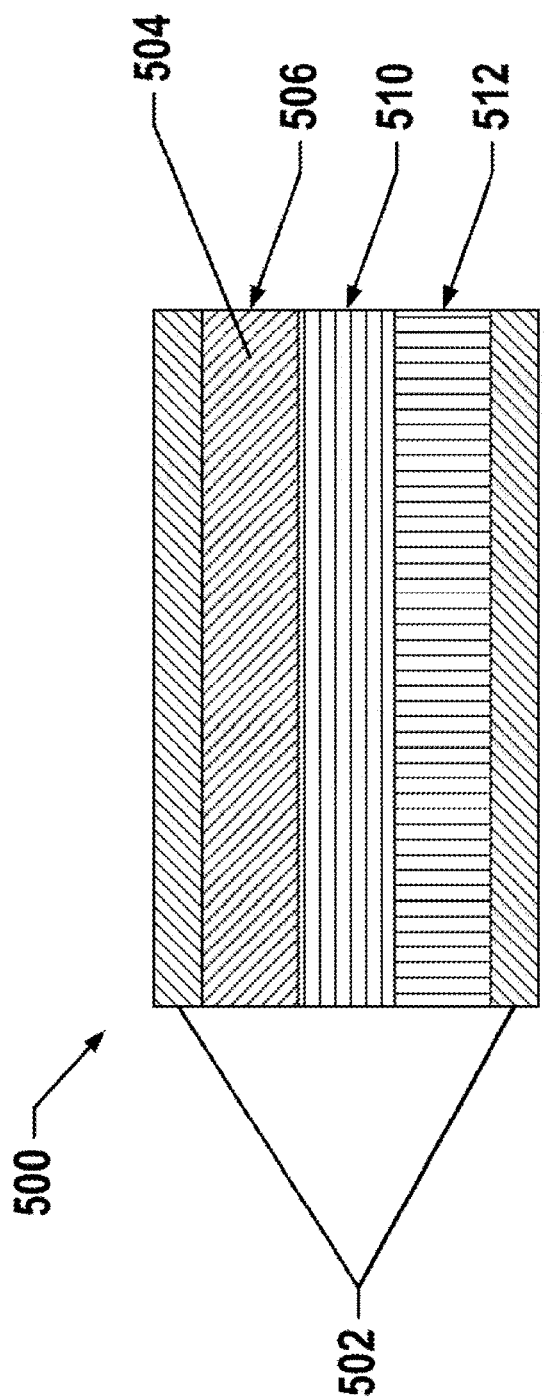
Figure 17:
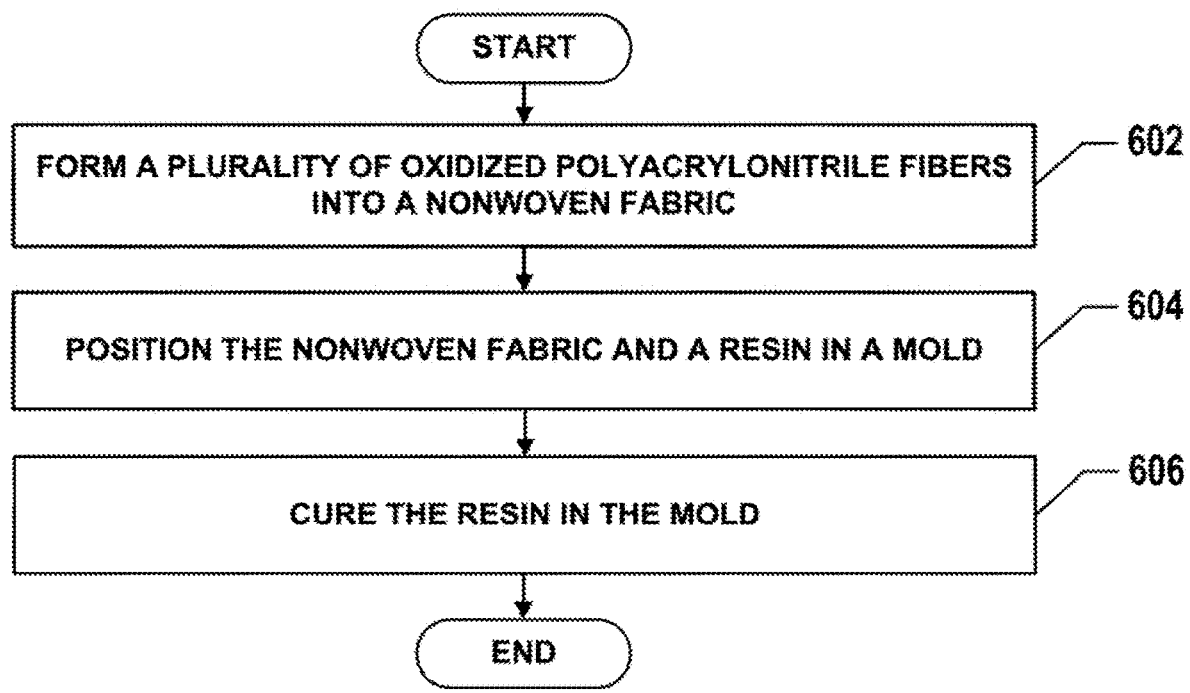

Having thus described the disclosure in general terms, reference will now be made to the accompanying drawings, which are not necessarily drawn to scale, and wherein:

FIG. 1 schematically illustrates cutting a piece of carbon fiber from a sheet of carbon fiber fabric according to an example embodiment of the present disclosure;

FIG. 2 illustrates a perspective view of a piece of nonwoven fabric according to an example embodiment of the present disclosure;

FIG. 3 schematically illustrates a mold in an open configuration according to an example embodiment of the present disclosure;

FIG. 4 illustrates a perspective view of a piece of woven fabric including carbon fibers according to an example embodiment of the present disclosure;

FIG. 5 illustrates a perspective view of loose carbon fibers according to an example embodiment of the present disclosure;

FIG. 6 illustrates overlapping material scraps comprising woven fabric according to an example embodiment of the present disclosure;

FIG. 7 illustrates the mold of FIG. 3 in a closed configuration according to an example embodiment of the present disclosure;

FIG. 8 illustrates a composite produced in the mold of FIG. 3 according to an example embodiment of the present disclosure;

FIG. 9 schematically illustrates a sectional view through the composite of FIG. 8 according to an example embodiment of the present disclosure wherein the composite includes resin and a substantially continuous layer comprising scrap materials;

FIG. 10 schematically illustrates a sectional view through the composite of FIG. 8 according to an example embodiment of the present disclosure wherein the composite includes resin, a substantially continuous layer comprising scrap materials, and a plurality of additional layers;

FIG. 11 illustrates a perspective view of a plurality of pre-impregnated carbon fiber chips according to an example embodiment of the present disclosure;

FIG. 12 schematically illustrates a method for forming a composite comprising material scraps according to an example embodiment of the present disclosure;

FIG. 13 schematically illustrates a sectional view through a composite according to an example embodiment of the present disclosure wherein the composite includes resin and a plurality of oxidized polyacrylonitrile fibers;

FIG. 14 illustrates a perspective view of wet-lay nonwoven fabric comprising oxidized polyacrylonitrile fibers according to an example embodiment of the present disclosure;

FIG. 15 illustrates a perspective view of needle-punch nonwoven fabric comprising oxidized polyacrylonitrile fibers according to an example embodiment of the present disclosure;

FIG. 16 schematically illustrates a sectional view through the composite of FIG. 13 according to an example embodiment of the present disclosure wherein the composite further includes one or more additional layers;

FIG. 17 schematically illustrates a method for forming a composite comprising resin and nonwoven fabric comprising oxidized polyacrylonitrile fibers according to an example embodiment of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

As described hereinafter, in one aspect the present disclosure relates to recycling carbon fiber. In this regard, the production of carbon fiber may result in a significant amount of waste. By one estimate, virgin carbon fiber composites production is only approximately 60% efficient, meaning that 40% of carbon fiber produced is considered waste.

In this regard, carbon fiber is typically produced as a roll of fabric having a uniform width and from which portions thereof are cut out to define the desired shape of a part. As a result of the parts produced from the carbon fiber not necessarily defining a shape and/or size that matches the roll of carbon fiber fabric, waste may be produced. By way of example, FIG. 1 illustrates a sheet of carbon fiber fabric 100 which may be cut from a roll of carbon fiber fabric. As illustrated, when a round piece of carbon fiber 102 is cut from the sheet of carbon fiber fabric 100, a significant quantity of waste carbon fiber material 104 may be produced.

Such carbon fiber waste has been traditionally viewed as useless and disposed of as trash. Thereby, the carbon fiber waste may end up in landfills. By one estimate, approximately 50,000 metric tons of carbon fiber is used each year. Accordingly, a large quantity of carbon fiber is being disposed of as waste. Notably, carbon fiber is relatively expensive to manufacture, and hence the monetary losses associated with failing to use all of the carbon fiber and disposing of the unused scrap materials may be significant.

In light of the significant quantity of waste carbon fiber materials being produced, methods for recycling carbon fiber materials have been sought. Known methods view the waste carbon fiber as being unsuitable for use in composites without first processing the waste carbon fiber in some manner. For example, many methods for recycling carbon fiber materials involve forming the waste carbon fiber into a nonwoven fabric. In order to form the nonwoven fabric, the waste carbon fiber may be cut into short lengths (e.g., less than 1 inch, and usually less than ½ inch) and directed through a carding machine such that the carbon fibers are relatively uniform in length and consistency and suitable as an input for a nonwoven machine. An example embodiment of a nonwoven material 200 is illustrated in FIG. 2.

However, as a result of the cutting operation, composites produced from the nonwoven material may define substantially reduced strength as compared to composites produced from the original, continuous carbon fiber fabric. In this regard, the continuous filaments in the original carbon fiber fabric may provide significantly more strength as compared to the relatively short fibers in the nonwoven material as a result of the cutting operation performed thereon.

Other methods for recycling carbon fiber have been explored. Such methods often involve the application of heat (e.g., pyrolysis) or chemicals to recover the carbon fibers. However, usage of heat and/or chemicals may increase the costs and complexity associated with recycling the carbon fibers. Additional methods for recycling carbon fiber are described, by way of example, in Pimenta S, Pinho S T, 2011, *Recycling carbon fibre reinforced polymers for structural applications: Technology review and market outlook*, WASTE MANAGEMENT, Vol: 31, Pages: 378-392, ISSN: 0956-053X.

Accordingly, embodiments of the present disclosure are directed to methods for recycling carbon fibers that may not suffer from the drawbacks associated with known carbon fiber recycling techniques. In this regard, embodiments of the present disclosure may provide a simplified process for forming composites from material scraps comprising carbon fibers that do not require an additional cutting operation or the application of heat or chemicals in order to prepare carbon fiber material scraps for usage in the formation of a composite. Further, the composites may define improved strength characteristics as compared to other embodiments of composites formed from recycled carbon fiber materials.

According to one embodiment of the present disclosure, composites may be formed in a mold. As may be understood, the particular shape of the mold may vary depending on the desired shape of the final composite product. A mold 300 according to an example embodiment of the present disclosure is illustrated in FIG. 3. In one embodiment the mold 300 may include a first portion 302 configured to receive one more materials such that the materials take on a shape defined by the first portion. In some embodiments the mold 300 may further comprise a second portion 304. The second portion 304 of the mold 300 may cooperate with the first portion 302 of the mold to define a product having a desired shape. The mold 300 may thus comprise a compression mold in some embodiments.

For example, in some embodiments the mold 300 may be configured to receive a plurality of material scraps 306 respectively comprising a plurality of carbon fibers. The material scraps 306 may be produced from carbon fiber input materials comprising continuous carbon fibers. For example, the material scraps 306 may be provided as a woven fabric 306A or as a plurality of loose fibers 306B. FIG. 4 illustrates a perspective view of an example piece of woven fabric 306A comprising carbon fibers. In some embodiments the woven fabric 306a may comprise selvage material, resulting from trimming one or more edges of a sheet of woven carbon fiber fabric to define a desired shape, and the selvage material may be recycled via the methods disclosed herein. Further, FIG. 5 illustrates a perspective view of an example piece of loose fibers 306B. In some embodiments the loose fibers 306B may be waste carbon fibers from thread employed in the production of woven carbon fiber fabric. Thus, in some embodiments the material scraps 306 may be derived from any stage of carbon fiber production prior to the application of a resin thereto. Thereby, the material scraps 306 may exhibit flexibility, which may assist in formation of the material scraps into a desired shape in the mold 300.

In some embodiments the material scraps 306 may not be subjected to certain processing operations after being cut from the base material (e.g., a sheet of carbon fiber woven fabric or carbon fiber thread) and prior to placement in the mold 300. In particular, the material scraps 306 may not be heated or chemically treated prior to placement in the mold 300. Further, the material scraps 306 may not be subjected to any cutting operations between separation from the initial carbon fiber materials comprising continuous carbon fibers. In other words, the material scraps 306 may not be subjected to any cutting operations following separation from the initial carbon fiber materials. Thus, for example, in embodiments in which the material scraps 306 comprise woven fabric 306A, the material scraps may not be cut again after being separated from a sheet of woven carbon fiber fabric. By way of further example, in embodiments in which the material scraps 306 comprise loose fibers 306B, the material scraps may not be cut again after being separated from the thread employed in the production of woven carbon fiber fabric.

In contrast, as noted above, traditional carbon fiber recycling techniques cut material scraps into small pieces having fibers defining a length typically less than about one inch. In this regard, some traditional carbon fiber recycling techniques produce nonwoven fabrics. Production of nonwoven fabrics may require a continuous web of disentangled, cleaned, and intermixed fibers. Such a continuous web may be produced by first cutting, and then carding the scrap materials.

Thus, as a result of the cutting operation, traditional recycled carbon fiber materials may be formed from relatively short fibers (e.g., defining a length less than about one inch). In contrast, the recycled carbon fiber materials produced from the processes disclosed herein may be formed from material scraps having carbon fibers defining relatively longer lengths. In this regard, the material scraps 306 may not be cut again following separation from the initial carbon fiber materials.

As noted above, the mold 300 may be configured to receive the material scraps 306 therein. The material scraps 306 may be positioned in the mold 300 to at least partially overlap one another. For example, FIG. 6 illustrates overlapping material scraps 306 comprising woven fabric 306A. As may be understood, the material scraps 306 may additionally or alternatively comprise loose fibers 306B. As a result of the overlapping configuration, the material scraps 306 may define a substantially continuous layer 308, as illustrated in FIG. 3, which may be compacted when the first portion 302 and the second portion 304 of the mold are engaged.

Further, a resin 310 may be applied to the material scraps 306 in the mold 300. The resin 310 may be applied to the material scraps 306 in any of various manners including spraying, coating, brushing, etc. In some embodiments the resin 310 may be applied to the material scraps before the first portion 302 and the second portion 304 of the mold 300 are brought into engagement. In other embodiments the first portion 302 and the second portion 304 of the mold 300 may be brought into engagement before the resin 310 is applied to the material scraps 306.

After the resin 310 cures, the resin and the material scraps 306 may define a composite 312, as illustrated in FIG. 7. As illustrated in FIG. 8, the composite 312 may be removed from the mold 300 (see, e.g., FIG. 7) and retain the shape provided by the mold. Thereby, the composite 312 may define a shape-stable structure. As noted above, some, most, or all of the carbon fibers included in the composite 312 may define a length greater than one inch, which may provide the composite with greater strength than corresponding composites formed from nonwoven carbon fiber fabric.

In the embodiment described above, the composite 312 comprises a single substantially continuous layer 308 of the scrap materials 306 and the resin 310. As illustrated in FIG. 9, the resin 310 may also be positioned at one or more exterior surfaces in order to protect the carbon fibers in the substantially continuous layer 308 comprising the material scraps 306 (see, e.g., FIG. 3). However, as may be understood, the substantially continuous layer 308 may extend to one or more outer surfaces in other embodiments.

Further, as illustrated in FIG. 10, in some embodiments the composite 312 may comprise one or more additional layers 314, 316. The resin 310 may be applied between each layer, or the resin may be applied on top of the plurality of layers and allowed to seep therein. In some embodiments a negative pressure may be applied to the mold 300 in order to cause penetration of the resin into the one or more layers in any of the embodiments disclosed herein. Note that although a particular ordering of the layers 308, 314, 316 and the resin 310 is illustrated in FIG. 10, this ordering may be rearranged in any of various manners. Note further that although two additional layers 314, 316 are shown, fewer layers or a greater number layers may be included in the composite 312 in other embodiments.

In one embodiment one or more of the additional layers 314, 316 may be formed from carbon fiber materials. For example, one or more of the additional layer 314, 316 may comprise additional scrap materials 306 comprising carbon fibers. By way of further example, an additional layer may comprise one or both of woven fabric 306A and loose fibers 306b (see, e.g., FIG. 3).

In another embodiment, one or more of the additional layers 314, 316 may comprise carbon fiber in a differing form. For example, in one embodiment a plurality of pre-impregnated carbon fiber chips 318 (see, FIG. 11) may define one or more of the additional layers 314, 316. Thus, in some embodiments the material scraps may have already received resin and may themselves already define a composite. The pre-impregnated carbon fiber chips 318 may be positioned such that they at least partially overlap one another to define a second substantially continuous layer. In some embodiments the second substantially continuous layer may comprise an outer layer, which refers to a layer of the composite 312 having either only the resin, or nothing, between the layer and the outer surface of the composite. Thereby, in some embodiments the pre-impregnated carbon fiber chips 318 may be visible, which may provide a pleasing appearance.

In another embodiment, one or more of the additional layers 314, 316 may comprise a different material. For example, one or more of the additional layers 314, 316 may comprise an aramid layer, a fiber glass layer, a foam layer, or any other layer of material employed in other composites.

The composite 312 may define any of a variety of shapes and forms. In a preferred embodiment the composite 312 may define a sheet of material that may be employed, for example, as a shipping container panel, a countertop, or a storm barrier panel. With respect to shipping container panels, the composite may be relatively lightweight as compared to the materials traditionally employed therein. For example, shipping container floors are typically formed from wood, which may be relatively heavy. Accordingly, shipping costs may be reduced by employing the composite 312. In some embodiments the composite 312 may be attached (e.g., via fasteners such as screws) to a traditional shipping container floor such as plywood to define an outer surface (e.g., a top surface) thereof that is exposed to the products and materials undergoing shipment. In this regard, as a result of the resin 310, the composite 312 may be relatively easy to clean as compared to plywood. Similarly, storm barrier panels, which may for example cover and protect windows during hurricanes or other inclement weather, are typically formed from plywood, and hence the relatively light weight of the composite 312 may provide benefits in terms of ease of installation thereof. Further, countertops are often formed from heavy stones and other materials that may be relatively expensive to ship and difficult to install in comparison to countertops formed from the composite 312.

Further, as a result of the composite 312 including the resin 310, the composite may define a substantially sealed, fluid impervious structure, which may avoid issues with respect to insect infestation and contamination from bacteria and viruses, etc. In contrast, materials such as wood employed in shipping container panels may require extensive sanitary treatments, especially when undergoing international transport to avoid introducing foreign insects into a given location. Similarly, materials such as stone employed in countertops are naturally porous and fluid pervious and may thereby require sealing to facilitate cleaning thereof and avoid contamination, whereas the composite 312 may not require application of any sealant thereto. Accordingly, the composite 312 may define benefits as compared to other materials, particularly when configured as one of the products described herein.

FIG. 12 schematically illustrates a method for forming a composite. As illustrated, the method may include providing a resin at operation 402. Further, the method may include providing a plurality of material scraps respectively comprising a plurality of carbon fibers at operation 404. The material scraps may be provided as a woven fabric and/or a plurality of loose fibers. The method may additionally include positioning the material scraps in a mold such that the material scraps at least partially overlap one another and define a substantially continuous layer at operation 406. The method may also include adding the resin to the material scraps 408 and hardening the resin in the mold at operation 410.

In some embodiments the method may further comprise providing a plurality of pre-impregnated carbon fiber chips. The method may also include positioning the pre-impregnated carbon fiber chips in the mold such that the pre-impregnated carbon fiber chips at least partially overlap one another and define a second substantially continuous layer. Additionally, the method may include adding the resin to the pre-impregnated carbon fiber chips.

In some embodiments positioning the pre-impregnated carbon fiber chips in the mold may comprise positioning the pre-impregnated carbon fiber chips such that the second substantially continuous layer is an outer layer. Further, the method may include positioning at least one of an aramid material and a fiberglass material in the mold to define a strengthening layer and adding the resin to the strengthening layer.

In some embodiments providing the material scraps at operation 404 may include retaining the material scraps in an initial size and shape associated with formation of the material scraps. Hardening the resin in the mold at operation 410 may include forming a shipping container panel, a countertop, or a storm barrier panel. Providing the material scraps at operation 404 may comprise providing the fabric and the loose fibers.

In an additional aspect another embodiment of a composite is provided. As illustrated in FIG. 13, the composite 500 may include a resin 502 and a plurality of oxidized polyacrylonitrile fibers 504. The resin 502 may comprise a thermoset resin or a thermoplastic resin. The oxidized polyacrylonitrile fibers 504 may be provided as a nonwoven fabric. By way of example only, the polyacrylonitrile fibers 504 may be provided as a wet-lay nonwoven fabric. An example embodiment of a wet-lay nonwoven fabric 506 comprising oxidized polyacrylonitrile fibers 504 is illustrated in FIG. 14. In some embodiments the oxidized polyacrylonitrile fibers 504 may be recycled. In this regard, the oxidized polyacrylonitrile fibers 504 (e.g., fabric scraps or loose fibers) may be cut and directed through a carding machine.

Nonwoven fabrics may be alternatively formed via a needle-punch method. An example embodiment of a needle-punch nonwoven fabric 508 comprising oxidized polyacrylonitrile fibers 504 is illustrated in FIG. 15. However, nonwoven fabrics formed via a needle-punch method typically define an increased volume of open voids as compared to wet-lay nonwoven fabric. The open voids may tend to absorb resin, thereby rendering a composite comprising the needle-punch nonwoven fabric 508 relatively heavier than a composite formed from the wet-lay nonwoven fabric 506. Accordingly, it may be desirable to employ wet-lay nonwoven fabric 506 in the composite 500. Regardless of the type of nonwoven fabric employed, the composite 500 may benefit from inclusion of the oxidized polyacrylonitrile fibers 504 in that these fibers may provide enhanced impact resistance.

In this regard, FIG. 16 illustrates an embodiment of the composite 500 including a layer of the wet-lay nonwoven fabric 506 comprising oxidized polyacrylonitrile fibers 504 and one or more additional layers 510, 512. The additional layers 510, 512 may comprise one or more of any other materials employed in composites such as carbon fiber, fiberglass, and aramid.

Although the layers 506, 510, 512 are shown in a particular example order, it should be understood that various other configurations may be employed in other embodiments, and a greater or lesser number of layers may be employed. However, it may be preferable to provide the wet-lay nonwoven fabric 506 comprising the oxidized polyacrylonitrile fibers 504 as an outer layer in order to take advantage of the impart resistance provided by this layer, which may protect other layers. Thus, for example, the wet-lay nonwoven fabric 506 comprising oxidized polyacrylonitrile fibers 504 may be employed in a boat hull, and one or more of the additional layers 510, 512 may comprise fiberglass, which may be protected from impact by the oxidized polyacrylonitrile fibers.

FIG. 17 illustrates a method for forming a composite according to an additional example embodiment of the present disclosure. As illustrated, the method may include forming a plurality of oxidized polyacrylonitrile fibers into a nonwoven fabric at operation 602. Further, the method may include positioning the nonwoven fabric and a resin in a mold at operation 604. Additionally, the method may include curing the resin in the mold at operation 606.

In some embodiments, forming the oxidized polyacrylonitrile fibers into the nonwoven fabric at operation 602 may include forming the oxidized polyacrylonitrile fibers into a wet-lay nonwoven fabric. Positioning the nonwoven fabric and the resin in the mold at operation 604 may include positioning the wet-lay nonwoven fabric and the resin in the mold. Positioning the nonwoven fabric in the mold at operation 604 may include forming an outer layer with the nonwoven fabric.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

The invention claimed is:

1. A method of manufacturing a composite product, the method comprising:
   placing material scraps into a mold such that the material scraps partially overlap one another to define a first layer, the material scraps including composite chips having a cured first resin, the material scraps being non-virgin material, the material scraps including pre-impregnated carbon fiber chips;
   adding a second resin to the mold including the material scraps; and
   allowing the second resin to harden in the mold such that the material scraps and the second resin form the composite product including the cured first resin and the second resin.

2. The method of manufacturing according to claim 1, wherein placing the material scraps into the mold includes the material scraps including a woven fabric, a nonwoven fabric, or loose fibers.

3. The method of manufacturing according to claim 2, wherein placing the material scraps into the mold include forming a second layer of the woven fabric, the nonwoven fabric, or the loose fibers.

4. The method of manufacturing according to claim 1, wherein placing the material scraps includes placing the material scraps into the mold without further processing including cutting, separating, heated, or chemically treated after being collected from selvage materials.

5. The method of manufacturing according to claim 1, wherein allowing the second resin to harden in the mold includes the forming a shipping container panel, a shipping container floor, a countertop, a boat hull, or a storm barrier panel.

6. The method of manufacturing according to claim 1, wherein placing the material scraps into the mold includes placing fiber glass, foam, or aramid into the mold.

7. The method of manufacturing according to claim 1, wherein placing the material scraps into the mold includes positioning the composite chips in the first layer and a second outer layer of the composite product.

8. The method of manufacturing according to claim 1, further comprising placing material scraps into the mold includes the material scraps being non-virgin material.

9. A method of manufacturing a composite product, the method comprising:
   placing material scraps including pre-impregnated carbon fiber chips into a mold such that the material scraps partially overlap one another to define a first layer, the material scraps comprising carbon fibers and a first resin, the carbon fibers in the form of a fabric or loose fibers including the first resin applied thereto, the material scraps being non-virgin material;
   adding a second resin to the mold including the material scraps; and
   allowing the second resin to harden in the mold such that the material scraps and the second resin form the composite product including the carbon fibers, the first resin, and the second resin.

10. The method of manufacturing according to claim 9, further comprising placing additional material scraps into the mold such that the material scraps partially overlap one another to define a second layer.

11. The method of manufacturing according to claim 9, further comprising positioning an aramid material or a fiberglass material in the mold to form another layer.

12. The method of manufacturing according to claim 9, wherein placing the material scraps into the mold includes retaining the material scraps in an initial size and shape associated with formation of the material scraps.

13. The method of manufacturing according to claim 9, wherein allowing the second resin to harden in the mold includes the forming a shipping container panel, a shipping container floor, a countertop, a boat hull, or a storm barrier panel.

14. The method of manufacturing according to claim 9, further comprising collecting the material scraps from selvage material.

15. The method of manufacturing according to claim 14, wherein placing the material scraps includes placing the material scraps into the mold without further processing including cutting, separating, heated, or chemically treated after being collected from selvage materials.

16. The method of manufacturing according to claim 9, wherein placing the material scraps into the mold includes the material scraps comprising composite chips having cured resin.

17. The method of manufacturing according to claim 9, wherein placing the material scraps into the mold includes the material scraps having a dimension greater than 1 inch.

\* \* \* \* \*